(12) United States Patent
Matthews et al.

(10) Patent No.: US 10,461,787 B2
(45) Date of Patent: Oct. 29, 2019

(54) SPUR MITIGATION FOR PULSE OUTPUT DRIVERS IN RADIO FREQUENCY (RF) DEVICES

(71) Applicant: Silicon Laboratories Inc., Austin, TX (US)

(72) Inventors: Phillip Matthews, Driftwood, TX (US); Paul I. Zavalney, Austin, TX (US); John M. Khoury, Austin, TX (US); Karma S. Bhutia, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/883,232

(22) Filed: Jan. 30, 2018

(65) Prior Publication Data
US 2019/0238166 A1    Aug. 1, 2019

(51) Int. Cl.
| H04B 1/10 | (2006.01) |
| H04B 1/04 | (2006.01) |
| H04B 1/00 | (2006.01) |
| H04L 27/00 | (2006.01) |

(52) U.S. Cl.
CPC ......... *H04B 1/0475* (2013.01); *H04B 1/0035* (2013.01); *H04B 1/10* (2013.01); *H04L 27/0014* (2013.01)

(58) Field of Classification Search
CPC ...... H04B 1/10; H04B 1/0475; H04B 1/0035; H04L 27/0014
See application file for complete search history.

(56) References Cited

U.S. PATENT DOCUMENTS

| 3,805,043 A | 4/1974 | Clary |
| 3,911,368 A | 10/1975 | Hornoch |
| 3,987,490 A | 10/1976 | Highnote et al. |
| 4,027,242 A | 5/1977 | Yamanaka |
| 4,225,969 A | 9/1980 | Hong |
| 4,551,689 A | 11/1985 | Scala et al. |
| 4,590,439 A | 5/1986 | Goggin |
| 5,301,367 A | 4/1994 | Heinonen |

(Continued)

OTHER PUBLICATIONS

Chen, "A Spurious Emission Reduction Technique for Power Amplifiers Using Frequency Hopping DC-DC Converters", IEE Radio Frequency Integrated Circuits Symposium, 4 pgs. (2009).

*Primary Examiner* — David S Huang
(74) *Attorney, Agent, or Firm* — Egan Peterman Enders Huston (57) ABSTRACT

Systems and methods are disclosed for spur mitigation for pulse signal drivers in radio frequency (RF) devices. An RF integrated circuit includes RF circuitry and analog-to-digital (ADC) circuitry. The RF circuitry operates using a local oscillator (LO) clock to receive and/or transmit RF signals, and the ADC circuitry samples one or more analog input signals and has internal timing based upon a raw digital clock. A retime circuit receives the raw digital clock and the LO clock and has a retimed clock as an output. The retimed clock represents the raw digital clock retimed with the LO clock. While other digital circuitry is timed using the raw digital clock, one or more drivers are timed by the retimed clock and provide pulse output signals to output pads. Having the drivers timed with the retimed clock and other digital circuitry timed with the raw digital clock improves overall performance.

22 Claims, 5 Drawing Sheets

(56) References Cited

U.S. PATENT DOCUMENTS

| | | |
|---|---|---|
| 5,436,600 A | 7/1995 | Van Heteren et al. |
| 5,444,865 A | 8/1995 | Heck et al. |
| 5,465,409 A | 11/1995 | Borras et al. |
| 5,535,337 A | 7/1996 | Hogan et al. |
| 5,669,067 A | 9/1997 | Mambo |
| 5,844,868 A | 12/1998 | Takahashi et al. |
| 5,987,309 A | 11/1999 | Adachi et al. |
| 6,085,075 A | 7/2000 | Van Bezooijen |
| 6,201,952 B1 | 3/2001 | Shimizu et al. |
| 6,326,851 B1 | 12/2001 | Staszewski et al. |
| 6,606,004 B2 | 8/2003 | Staszewski et al. |
| 6,621,853 B1 | 9/2003 | Ku |
| 6,625,422 B1 | 9/2003 | Haruyama |
| 6,678,503 B1 | 1/2004 | Black et al. |
| 6,968,017 B2 | 11/2005 | Nielsen |
| 6,995,808 B2 | 2/2006 | Kovacic et al. |
| 7,003,274 B1 | 2/2006 | Olip |
| 7,269,228 B2 | 9/2007 | Shiung |
| 7,272,373 B2 | 9/2007 | Tuttle et al. |
| 7,444,167 B2 | 10/2008 | Chang et al. |
| 7,471,940 B2 | 12/2008 | Tuttle et al. |
| 7,515,931 B2 | 4/2009 | Olip |
| 7,551,127 B2 | 6/2009 | Dubash et al. |
| 7,593,695 B2 | 9/2009 | Jensen |
| 7,620,095 B2 | 11/2009 | Ben-Bassat |
| 7,680,227 B2 | 3/2010 | Kavadias et al. |
| 7,907,922 B2 | 3/2011 | Lee et al. |
| 8,259,876 B2 | 9/2012 | Shi et al. |
| 8,502,610 B2 | 8/2013 | Pellon et al. |
| 8,509,363 B2 | 8/2013 | Shi et al. |
| 8,705,654 B1 | 4/2014 | Khlat et al. |
| 9,590,644 B2 | 3/2017 | Khoury |
| 2007/0291823 A1 | 12/2007 | Ben-Bassat |
| 2008/0248765 A1 | 10/2008 | Gater |
| 2009/0058477 A1 | 3/2009 | Curtis |
| 2009/0175399 A1 | 7/2009 | Sun et al. |
| 2009/0238312 A1 | 9/2009 | Shi et al. |
| 2010/0097966 A1 | 4/2010 | Chen |
| 2010/0149033 A1 | 6/2010 | Abraham |
| 2010/0166123 A1 | 7/2010 | Pellon et al. |
| 2010/0201365 A1 | 8/2010 | Bollenbeck |
| 2011/0267025 A1 | 11/2011 | Wang et al. |
| 2012/0225629 A1 | 9/2012 | Shi et al. |
| 2013/0229954 A1 | 9/2013 | Narathong et al. |
| 2016/0119111 A1* | 4/2016 | Fernald ............ H04L 7/0338 375/371 |
| 2016/0233869 A1* | 8/2016 | Khoury ............ H03L 7/099 |

* cited by examiner

SPUR MITIGATION FOR PULSE OUTPUT DRIVERS IN RADIO FREQUENCY (RF) DEVICES

TECHNICAL FIELD

The technical field relates to radio frequency (RF) devices having pulse output drivers and related digital circuitry.

BACKGROUND

Radio frequency (RF) devices often include integrated circuits (ICs) that operate to receive RF input signals, transmit RF output signals, or both receive and transmit RF signals. Where receive functionality is included, RF communication ICs typically convert analog RF input signals to digital samples and then perform digital processing on these digital samples. Where transmit functionality is included, RF communication ICs typically apply digital logic to process digital data and then convert this digital data to RF output signals that are transmitted from the RF communication IC. The digital data can be generated internally within the RF communication IC and/or can be based upon off-chip sources. For example, an RF communication IC can monitor analog inputs and sample those inputs with analog-to-digital converter (ADC) circuitry to convert analog signals to digital samples. Analog signals can include, for example, analog inputs from one or more sensor devices.

Different clocks are typically used within RF communication ICs for various purposes. For example, as part of the processing of RF input signals and/or RF output signals, a local oscillator (LO) clock is often generated and used to downconvert RF input signals to lower frequencies or to upconvert output digital data to RF output signals. In addition, as part of the digital operations within the RF communication IC, clocks are utilized to time digital switching circuitry within digital processors, ADC circuitry, digital logic, and/or other digital circuitry. Periodic current pulses associated with digital switching within the digital circuitry, however, can generate spurs that interfere with the RF signals or other operations for the RF communication IC.

For certain solutions, RF communication ICs also include digital circuitry that drives output pads with pulsed digital signals, such as PWM (pulse width modulation) output signals. This output circuitry, such as PWM circuitry, is often required to run at an internal frequency that is higher than the RF operational frequencies for the RF communication IC in order to provide high resolution pulse output signals. In addition, these solutions can also include analog-to-digital converter (ADC) circuitry that periodically samples analog input signals. Such systems often have the output (e.g., PWM) circuitry share the same clock source with the ADC circuitry or can also have logic circuitry associated with the output circuitry directly trigger the ADC circuitry to take samples of analog inputs at known times. For example, sampling by ADC circuitry can be triggered when the output of the PWM circuitry is stable and temporally far away from a toggle event for the PWM circuitry in order to reduce interference and improve the fidelity of digital samples generated by the ADC circuitry.

With regard to RF operations, pulse output signals for output circuitry of the RF communication IC can cause spurs that introduce large amounts of interference on the RF receive signals and/or RF transmit signals. For example, toggling an output pin, such as a GPIO (general purpose input/output) pin, based upon output signals from PWM circuitry can generate spurs that interfere with the RF receive signals and/or RF transmit signals.

Spurs and digital switching interference can be addressed by driving the digital circuitry within the RF communication IC, such as the ADC circuitry and the PWM circuitry, with a digital clock that is retimed off of the LO clock used by the RF circuitry to receive and/or to transmit RF signals. However, while this retimed digital clock reduces interference with respect to the RF input/output signals due to being based upon the LO clock used for RF receive/transmit, this retimed digital clock introduces jitter with respect to timing operations for the digital circuitry within the system. This jitter often degrades performance. For example, jitter introduced by the retimed digital clock can reduce fidelity of digital samples generated by the ADC circuitry from analog input signals. Thus, while LO-based retiming of clocks can improve performance of the RF circuitry by reducing interference from toggling output signals (e.g., as produced by PWM circuitry), this LO-based retiming also tends to degrade precision and accuracy of other digital circuitry within the RF communication IC such as ADC circuitry.

SUMMARY OF THE INVENTION

Systems and methods are disclosed for spur mitigation for pulse signal drivers in radio frequency (RF) devices. For disclosed embodiments, an RF integrated circuit in part includes RF circuitry and analog-to-digital (ADC) circuitry. The RF circuitry operates using a local oscillator (LO) clock to receive and/or transmit RF signals, and the ADC circuitry samples one or more analog input signals and has internal timing based upon a raw digital clock. A retime circuit receives the raw digital clock and the LO clock as inputs and has a retimed clock as an output. The retimed clock represents the raw digital clock retimed with the LO clock. While other digital circuitry is timed using the raw digital clock, one or more drivers are timed by the retimed clock, and each driver is coupled to an output pad to provide a pulse output signal. Having the drivers controlled by the retimed clock and other digital circuitry timed with the raw digital clock improves overall performance. Other features and variations can also be implemented, and related systems and methods can be utilized, as well.

For one embodiment, an integrated circuit is disclosed including a first clock generator having a digital clock as an output, a second clock generator having a local oscillator (LO) clock as an output, radio frequency (RF) circuitry coupled to operate using the LO clock, a circuit coupled to receive the digital clock and the LO clock as inputs and having a retimed clock as an output where the retimed clock represents the digital clock retimed with the LO clock, digital circuitry coupled to have internal timing based upon the digital clock, and one or more drivers coupled to be timed by the retimed clock, each driver being coupled to provide a pulse output signal to an output pad.

In additional embodiments, the integrated circuit further includes output circuitry including the one or more drivers, and digital circuitry within the output circuitry other than the one or more drivers is coupled to have internal timing based upon the digital clock. In further embodiments, the output circuitry includes pulse width modulation (PWM) output circuitry, and the one or more drivers include PWM drivers.

In additional embodiments, the digital circuitry includes analog-to-digital converter (ADC) circuitry coupled to one or more input pads to sample one or more analog input signals and coupled to have internal timing based upon the digital clock. In further embodiments, the integrated circuit further includes controller circuitry having internal timing based upon the digital clock and having one or more sampling trigger signals as outputs that are coupled to the ADC circuitry to determine sample timing with respect to the one or more analog input signals.

In additional embodiments, the one or more drivers are configured to selectively receive the digital clock or the retimed clock as a timing clock. In further embodiments, the integrated circuit also includes a multiplexer associated with each of the one or more drivers, and each multiplexer has the digital clock and the retimed clock as inputs and has the timing clock as an output.

In additional embodiments, the one or more drivers is a plurality of drivers; a first set of the drivers are configured to receive the digital clock as a timing clock; a second set of the drivers are configured to receive the retimed clock as a timing clock; and one or more output pads are configured to selectively receive an output from a driver in the first set of drivers or an output from a driver in the second set of drivers. In further embodiments, the integrated circuit also includes one or more multiplexers associated with first set of drivers and the second set of drivers, and each multiplexer has an output from a driver in the first set of drivers and an output from a driver in the second set of drivers as inputs and has an output coupled to an output pad.

In additional embodiments, each of the one or more drivers comprises latch circuitry and an output stage. In further embodiments, the latch circuitry and the output stage are implemented using a data (D) latch and data (D) flip-flops.

For one embodiment, a method to operate an integrated circuit is disclosed including generating a digital clock, generating a local oscillator (LO) clock, operating radio frequency (RF) circuitry using the LO clock, retiming the digital clock with the LO clock to generate a retimed clock, timing digital circuitry with the digital clock, and timing one or more drivers with the retimed clock where each driver provides a pulse output signal to an output pad. For the method, the generating, operating, retiming, and timing occur within an integrated circuit.

In additional embodiments, the one or more drivers are included within output circuitry, and the method also includes timing digital circuitry within the output circuitry other than the one or more drivers with the digital clock. In further embodiments, the output circuitry includes pulse width modulation (PWM) output circuitry, and the one or more drivers include PWM drivers.

In additional embodiments, the timing digital circuitry includes timing analog-to-digital convert (ADC) circuitry with the digital clock to sample one or more analog input signals from one or more input pads. In further embodiments, the method further includes timing controller circuitry with the digital clock and outputting one or more sampling trigger signals from the output circuitry to the ADC circuitry to determine sample timing with respect to the one or more analog input signals.

In additional embodiments, the method further includes selectively providing the digital clock or the retimed clock as a timing clock to the one or more drivers. In further embodiments, the method also includes using a multiplexer associated with each of the one or more drivers to selectively provide the digital clock or the retimed clock as the timing clock.

In additional embodiments, the one or more drivers is a plurality of drivers, and the method further includes receiving the digital clock as a timing clock for a first set of the drivers, receiving the retimed clock as a timing clock for a second set of the drivers, and selectively providing an output from a driver in the first set of drivers or an output from a driver in the second set of drivers to one or more output pads. In additional embodiments, one or more multiplexers are associated with first set of drivers and the second set of drivers, and the method includes for each multiplexer, receiving an output from a driver in the first set of drivers and an output from a driver in the second set of drivers as inputs and providing an output to an output pad.

In additional embodiments, each of the one or more drivers includes latch circuitry and an output stage. In further embodiments, the latch circuitry and the output stage are implemented using a data (D) latch and one or more data (D) flip-flops.

Other features and variations can also be implemented, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Systems and methods are disclosed for spur mitigation for pulse signal drivers in radio frequency (RF) devices. For disclosed embodiments, an RF integrated circuit in part includes RF circuitry and analog-to-digital (ADC) circuitry. The RF circuitry operates using a local oscillator (LO) clock to receive and/or transmit RF signals, and the ADC circuitry samples one or more analog input signals and has internal timing based upon a raw digital clock. A retime circuit receives the raw digital clock and the LO clock as inputs and has a retimed clock as an output. The retimed clock represents the raw digital clock retimed with the LO clock. While other digital circuitry is timed using the raw digital clock, one or more drivers are timed by the retimed clock, and each driver is coupled to an output pad to provide a pulse output signal. Other features and variations can be implemented for the embodiments described herein, and related systems and methods can be utilized, as well.

As described herein, disclosed embodiments provide the ability to maintain timing accuracy for pulse output signals, such as PWM (pulse width modulation) output signals, while also maintaining fidelity with respect to sampling by ADC circuitry and further while reducing spur interference for RF receive and transmit signals. The disclosed embodiments apply a retimed clock, which has been retimed based upon an LO clock, only to output stage drivers for pulse output signals coupled to output pads thereby allowing other digital circuitry, such as digital logic and ADC circuitry, to run on an accurate, non-retimed clock. The disclosed embodiments thereby maintain high accuracy with PWM output signals and sampling by ADC circuitry while reducing jitter caused by the pulse output signals. In contrast, prior solutions require direct alignment of the digital clock with the LO clock or retiming of the digital clock to the LO clock. Aligning the digital clock with the LO clock limits frequency selection and reduces accuracy for pulse output signals (e.g., PWM output signals). Retiming of the digital clock to the LO clock introduces jitter to the digital clock, and this jitter reduces sampling fidelity for ADC circuitry as the digital clock also typically controls sample times for the ADC circuitry. The disclosed embodiments avoid these problems with prior solutions by applying a retimed clock only to output stage drivers for pulse output signals.

Figure 1:
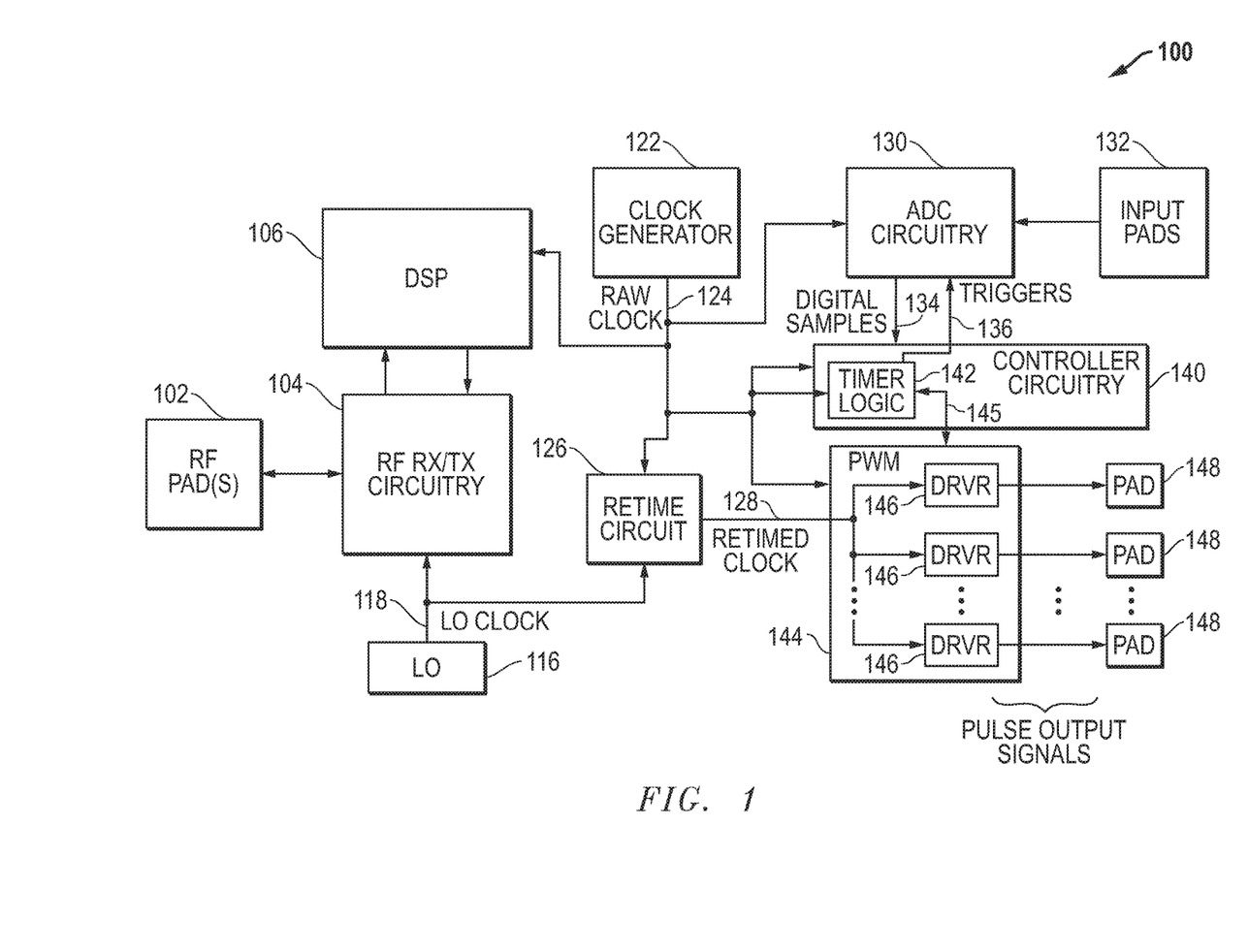
FIG. 1 is a block diagram of an example embodiment for a radio frequency (RF) communication integrated circuitry (IC) where a retimed clock is applied only to output stage drivers for pulse output signals.

FIG. 1 is a block diagram of an example embodiment for an RF communication IC 100 where a retimed clock 128 is applied only to output stage drivers 146 for pulse output signals. The RF communication IC includes RF circuitry 104, digital signal processor (DSP) 106, local oscillator (LO) circuitry 116, clock generator 122, retime circuit 126, analog-to-digital converter (ADC) circuitry 130, and controller circuitry 140. The RF circuitry 104 is connected to one or more RF pads 102. The ADC circuitry is connected to one or more input pads 132. The controller circuitry 140 includes timer logic 142. In addition to other circuitry, the PWM (pulse width modulation) circuitry 144 includes one or more output stage drivers 146 that are connected to one or more output pads 148. It is further noted that the PWM circuitry 144 can more generally be any output circuitry having one or more drivers 146 that generate pulse output signals connected to one or more output pads 148, although the discussion below uses PWM circuitry as an example for this output circuitry.

With respect to clocks and internal timing, operations of the different components for the RF communication IC 100 are based upon a raw digital clock 124 generated by the clock generator 122, a retimed clock 128 generated by retime circuit 126, an LO clock 118 generated by the LO circuitry 116, and/or other generate clocks. For the example embodiment depicted, the digital circuitry within the DSP 106, the retime circuit 126, the ADC circuitry 130, the controller circuitry 140, and the PWM circuitry (except for the output stage drivers 146) operate with internal timing based upon the raw digital clock 124 generated by the clock generator 122. The RF circuitry 104 operates based upon an LO clock 118 generated by LO circuitry 116. The retimed clock 128 generated by retime circuit 126 is used to time only the output stage drivers 146 within the PWM circuitry 144 rather than the other digital circuitry within the PWM circuitry 144 thereby providing the advantages described herein.

Looking to the RF related components, the RF circuitry 104 operates as an RF receiver (RX) to receive RF signals from the RF pads 102, as an RF transmitter (TX) to transmit RF signals to the RF pads 102, or as an RF transceiver to both receive and transmit RF signals. The RF circuitry 104 can be implemented using a wide variety of architectures that receive and/or transmit RF signals within one or more selected frequency bands from thousands of Hertz to gigahertz frequencies and above. For these RF operations, the RF circuitry 104 is coupled to receive a local oscillator (LO) clock 118 from local oscillator (LO) circuitry 116, and the LO clock 118 is used within the RF receive/transmit circuitry 104 to downconvert RF input signals to lower frequency signals, upconvert digital data to RF transmit signals, and/or for other RF receive path or RF transmit path operations.

It is noted that the LO circuitry 116 can be configured to generate the LO clock 118 for one or more frequency bands of operation. Further, the LO circuitry 116 can be configured to generate LO clock 118 based upon one or more channels within a frequency band of operation. As such, the frequency for the LO clock 118 can change over time based upon a selected frequency band of operation and/or a selected channel within the frequency band of operation. The LO circuitry 116 can be implemented based upon any desired clock architecture. For one example embodiment, the LO circuitry 116 can be a phase lock loop (PLL) based circuit that relies upon a reference clock signal from an external crystal oscillator to generate the LO clock 118 at selected frequencies across a range of frequencies. For one example, the LO clock 118 has a base frequency of about 600 MHz (Megahertz). Further, one or more dividers can be used with respect to the LO circuitry 116 to generate desired output frequencies.

The RF circuitry 104 is coupled to the DSP 106, and the DSP 106 provides any needed digital processing, such as demodulation for the incoming RF receive signals and/or modulation for outgoing RF transmit signals. For example, the DSP 106 can include analog-to-digital converter circuitry that converts analog RF receive signals to digital receive samples, can include a demodulator to demodulate the digital receive samples into digital receive data, can include a modulator that modulates digital transmit data, and can include digital-to-analog converter circuitry that converts digital transmit data to analog RF transmit signals. Further, the DSP 106 can process the digital receive data and the digital transmit data as needed to provide desired functionality for the RF communication IC 100. The DSP 106 receives a raw digital clock 124 from clock generator 122, and the DSP 106 uses this raw digital clock 124 to time internal digital switching operations for digital circuitry within the DSP 106. For example, a variety of transistor-based logic can be included within the DSP 106, and switching operations for this transistor-based logic can be controlled using the raw digital clock 124.

The clock generator 122, which generates the raw digital clock 124, can be implemented based upon any desired clock architecture. For one example embodiment, the clock generator 122 can be an RC (resistor-capacitor) based oscillator circuit that generates the raw digital clock 124 at a desired frequency. For one example embodiment, the raw digital clock 124 has a base frequency of about 80 MHz. Further, the clock generator 122 can be configured to generate multiple output clocks, and one or more dividers can be used with respect to the clock generator 122 to generate desired clock frequencies.

Looking to additional digital components for the RF integrated IC 100, the ADC circuitry 130, the controller circuitry 140, and the PWM circuitry 144 (except for the output stage drivers 146) are timed using the raw digital clock 124. The ADC circuitry 130 can include one or more electronic circuits including transistors and digital logic controlled by one or more clock signals, such as sigma-delta analog to digital converters and/or SAR (success approximation register) converters, that receive and sample analog inputs received at the input pads 132 to generate digital samples 134. For one example embodiment, analog input signals from external sensors are received by the input pads 132 for the RF communication IC 100. These analog input signals are converted to digital samples 134 by the ADC circuitry 130 and communicated to the controller circuitry 140. The sampling of by the ADC circuitry 130 of the analog input signals at the input pads 132 can be based upon one or more triggers 136 that are communicated to the ADC circuitry 130 as sampling control signals by timer logic 142 within the controller circuitry 140. The controller circuitry 140 including timer logic 142 can be programmed in part to execute code stored in memories within the RF communication IC 100 to implemented desired functionality. The raw digital clock 124 is used to time internal operations for the ADC circuitry 130, the controller circuitry 140 including timer logic 142, and the PWM circuitry 144 (except for the output drivers 146). For example, a variety of transistor-based logic can be included within the ADC circuitry 130, the controller circuitry 140, and the PWM circuitry 144, and switching operations for this transistor-based logic can be controlled using the raw digital clock 124.

The retime circuit 126 receives the raw digital clock 124 and the LO clock 118 as input signals and generates the retimed clock 128 as an output signal. The retimed clock 128 thereby represents the raw digital clock 124 retimed with the LO clock 118. The retimed clock 128 is coupled to the output stage drivers 146. The output stage drivers 146 use the retimed clock 128 to time digital switching operations for digital circuitry within the output stage drivers 146. For example, a variety of transistor-based logic can be included within the output stage drivers 146, and switching operations for this transistor-based logic can be controlled using the retimed clock 128. For one example embodiment, the output stage drivers 146 output PWM signals to the output pads 148 based upon digital signals 145 communicated between the PWM circuitry 144 and the timer logic 142 within the controller circuitry 140. It is noted that more generally the drivers 146 can generate pulse output signals to the output pads 148.

As described herein, the retimed clock 128 based upon the LO clock 118 is used only to time the switching operation of output stage drivers 146. The raw digital clock 124 is used for switching operations for digital circuits within the controller circuitry 140, the ADC circuitry 130, and other portions of the output (e.g., PWM) circuitry 144. As such, jitter introduced by the retimed clock 128 through the retiming based upon the LO clock 118 is limited to the output stage drivers 146. The fidelity of the sampling provided by the ADC circuitry 130 and the precision of the remaining PWM circuitry 144 and controller circuitry 140 are thereby maintained because the retimed clock 128 is only used for output stage drivers 146. Further, the RF circuitry 104 is still protected from spur interference generated by pulse output signals on the output pads 148 because the output stage drivers 146 use a retimed clock 128 that has been retimed based upon the LO clock 118 being used by the RF circuitry 104.

Figure 2A:
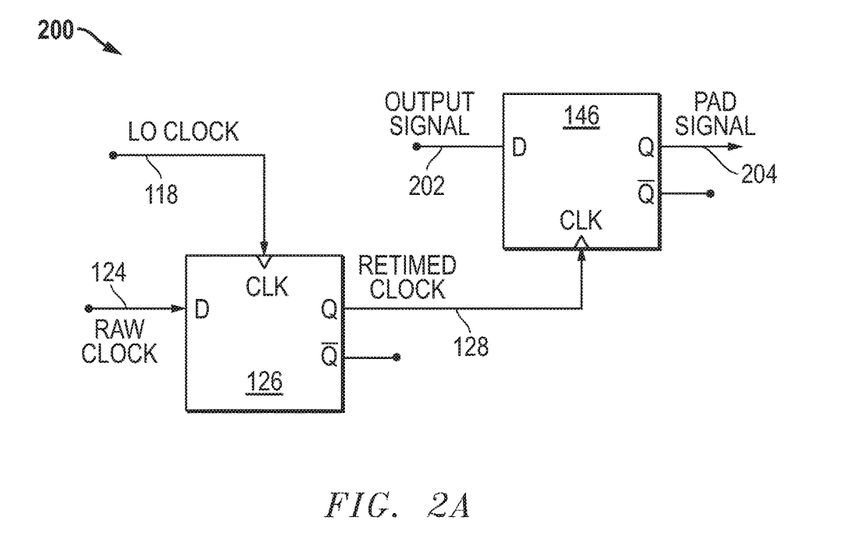
FIG. 2A is a circuit diagram of an example embodiment for a retime circuit and an output stage driver implemented using data (D) flip-flops.

FIG. 2A is a circuit diagram of an example embodiment 200 for a retime circuit 126 and an output stage driver 146 implemented using data (D) flip-flops. The retime circuit 126 receives the raw digital clock 124 as the data (D) input, receives the LO clock 118 as the clock (CLK) input, and generates the retimed clock 128 as the data output (Q). Operating as a D flip-flop, the data output (Q) is set to the state of the raw digital clock 124 when the LO clock 118 transitions (e.g., to a high logic level). The output stage driver 146 receives the retimed clock 128 as the clock (CLK) input, receives an output signal 202 as the data (D) input, and generates the pad signal 204 as the data output (Q). Operating as a D flip-flop, the data output (Q) is set to the state of the output signal 202 when the retimed clock 128 transitions (e.g., to a high logic level). It is noted that other architectures and circuitry can be used for retime circuit 126 while still taking advantage of the retiming techniques described here where retiming is applied only at the output stage drivers.

Figure 2B:
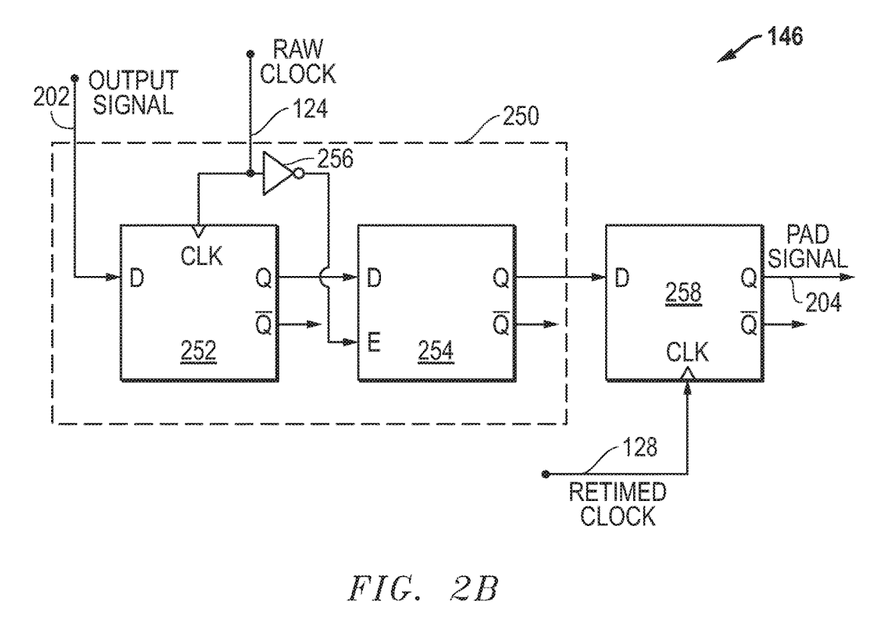
FIG. 2B is a circuit diagram of an example embodiment where the output driver is implemented using a latch and a data (D) flip-flop.

FIG. 2B is a circuit diagram of an example embodiment where the output driver 146 is implemented using latch circuitry 250 and a D flip-flop 258. For this example embodiment, latch circuitry 250 is implemented using a D flip-flop 252 and a D latch 254. Operating as a D flip-flop, the data outputs (Q) for D flip-flop 252/258 are set to the state of the data (D) input when the clock (CLK) input transitions (e.g., to a high logic level). Operating as a D latch, the state of the data (D) input propagates through and is latched as the data output (Q) for the D latch 254 when the enable (E) input is active (e.g., high logic level). Looking back to FIG. 2B, the output signal 202 is received at the data (D) input for D flip-flop 252, and the data output (Q) for D flip-flop 252 is coupled to the data (D) input for D latch 254. The data output (Q) for D latch 254 is coupled to the data (D) input for the output stage D flip-flop 258. The data output (Q) for the D flip-flop 258 provides the pad signal 204. The clock (CLK) input for D flip-flop 252 is the raw digital clock 124, and the enable (E) input for D latch 254 is an inverted version of the raw digital clock 124 after passing through an inverter 256. The clock (CLK) input for the output stage D flip-flop 258 is the retimed clock 128. During operation, the latch circuitry 250 captures the output signal 202 based upon the raw digital clock 124. By latching the output signal 202, the latch circuitry 250 helps to ease timing requirements for the output stage D flip-flop 258 and reduce jitter on the pad signal 204. The use of latch circuitry 250 is particularly helpful for clock operating frequencies for the raw digital clock 124 and/or the retimed clock 128 at 50 MHz or above. Other variations can also be implemented with respect to the retime circuit 126 and/or the drivers 146 while still taking advantage of the techniques described herein.

Figure 3A:
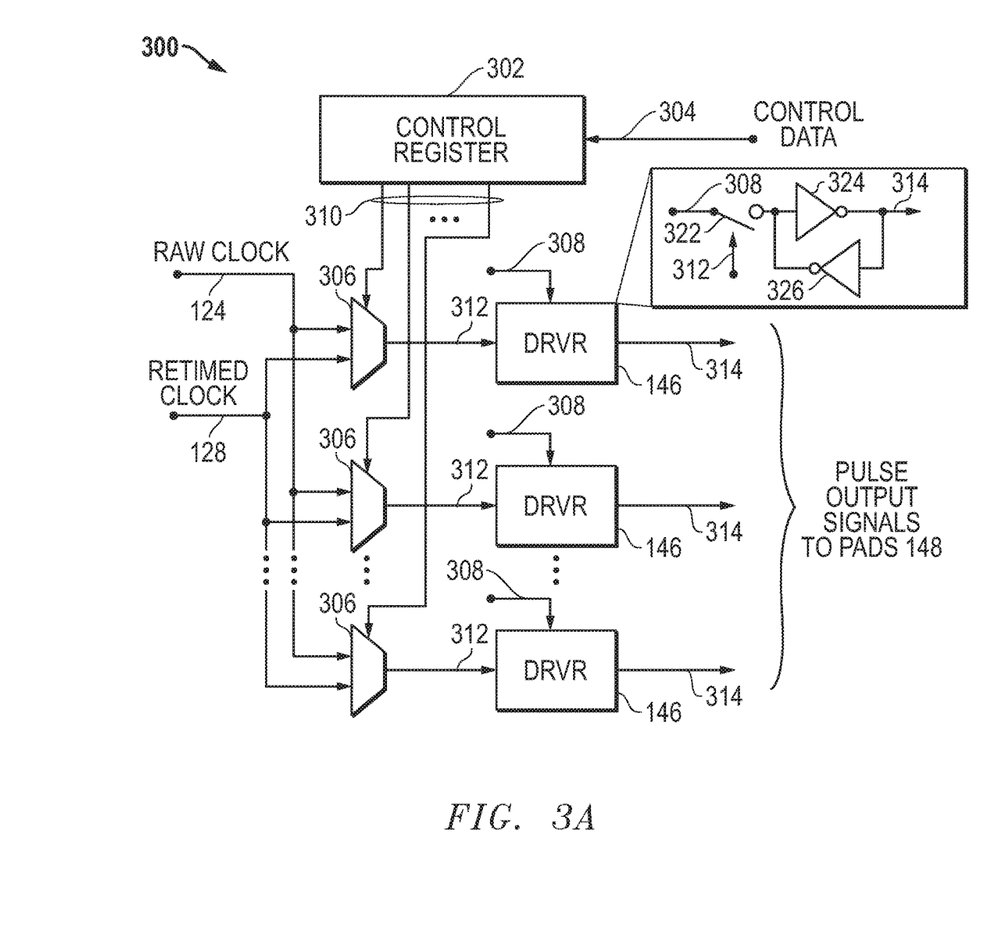
FIG. 3A is a block diagram of an example embodiment where multiplexers are included to allow for programmable selection of whether to apply the raw digital clock or the retimed clock to the output stage drivers.

FIG. 3A is a block diagram of an example embodiment 300 where multiplexers 306 are included to allow for programmable selection of whether to apply the raw digital clock 124 or the retimed clock 128 to the output stage drivers 146. For example, where output accuracy is not needed for a pulse output signal generated by a driver 146, that driver can receive the raw digital clock 124 instead of the retimed clock 128. For the example embodiment 300, the control register 302 receives and stores control data 304 that determines the control signals 310 output to multiplexers 306 to determine the selection of the clock to be output to the respective drivers 146. Each of the control signals 310 can be configured to have a first logic state if the raw digital clock 124 is to be output by the multiplexer 306 to its respective output stage driver 146. Each of the control signals 310 can be configured to have a second logic state if the retimed clock 128 is to be output by the multiplexer to its respective output stage driver 146. The clock 312 received by each output stage driver 146 from its respective multiplexer 306 will determine the timing for the pulse output signal 314 generated by that output stage driver 146 from an output signal 308. The output signals 308 for the drivers 146 can be generated, for example, by other digital circuitry within the output circuitry (e.g., PWM circuitry) 144 based upon digital signals 145 communicated by the timer logic 142 within the controller circuitry 140. It is noted that other architectures and circuitry can be used to select and provide various timing clocks to the output stage drivers 146 while still taking advantage of the retiming techniques described here where retiming is applied only at the output stage drivers.

It is noted that the output stage drivers 146 can be implemented using various driver architectures where the timing of pulse output signals are based upon the retimed clock 128. For example as stated above, each output stage driver 146 can be implemented with one or more latches that store and output the logic state of an output signal 308 based upon the rising edge and/or falling edge of the clock 312, such as the retimed clock 128. Based upon transitions within the output signals 308 and the clock 312, the one or more latches will generate pulse output signals 314 having selected pulse densities and widths, and these pulse output signals 314 that are then provided to a connected output pad 148. As one further example embodiment shown in FIG. 3A, a driver 146 can include a switch (e.g., CMOS transistor) 322 controlled by the clock 312, such as the retimed clock 128, and a latch formed by inverters 324/326. The A latch formed by inverters 324 and 326 stores the state of the output signal 308 when the switch 322 is closed. Based upon transitions within the output signal 308 and the clock 312, the latch 324/326 outputs a pulse output signal 314 that is provided to a connected output pad 148. It is noted that other architectures and circuitry can be used to implement the output stage drivers 146 while still taking advantage of the retiming techniques described here where retiming is applied only at the output stage drivers.

Figure 3B:
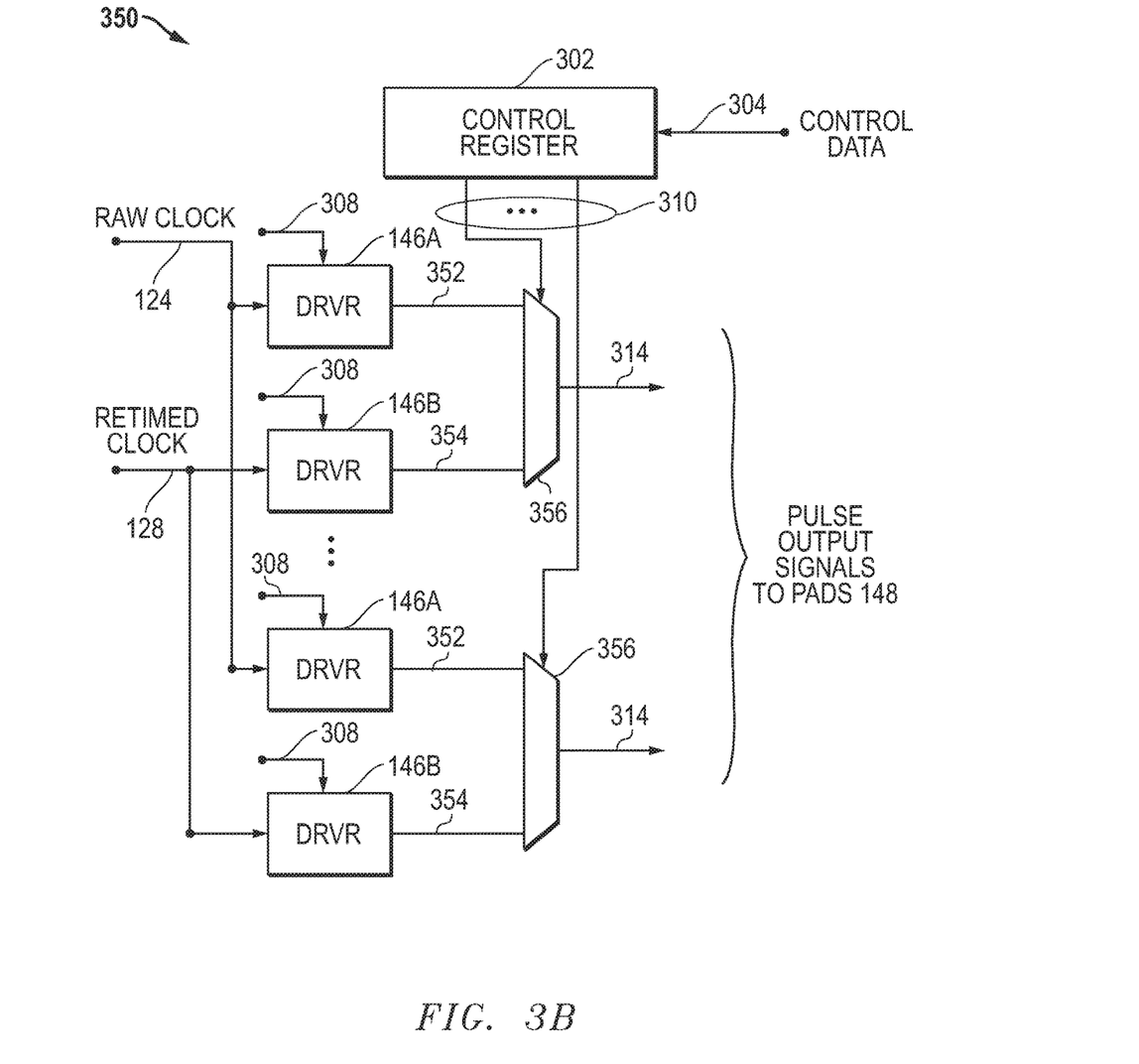
FIG. 3B is a block diagram of an example embodiment where multiplexers are included to allow for programmable selection between two or more output stage drivers to generate pulse output signals that are provided to output pads based on either the raw digital clock or the retimed clock.

FIG. 3B is a block diagram of an example embodiment 350 where multiplexers 356 are included to allow for programmable selection between two or more output stage drivers 146A/146B to generate pulse output signals 314 that are provided to output pads 148 based on either the raw digital clock 124 or the retimed clock 128. For example, where output accuracy is not important for a pulse output signal 314, the pad can receive the output 352 from a driver 146A timed using the raw digital clock 124 instead of the driver 146B timed using the retimed clock 128. The output stage drivers 146A/146B can also be implemented differently, if desired, depending upon the clock 124/128 being received and used. For the example embodiment 350, the control register 302 receives and stores control data 304 that determines the control signals 310 output to multiplexers 356 to determine the selection of the outputs 352/354 from the drivers 146A/46B. Each of the control signals 310 can be configured to have a first logic state if the output 352 from output stage driver 146A using the raw digital clock 124 is to be output by the multiplexer 356 as the pulse output signal 314 to the pad. Each of the control signals 310 can be configured to have a second logic state if the output 354 from output stage driver 146B using the retimed clock 128 is to be output by the multiplexer 356 as the pulse output signal 314 to the pad. It is noted that other architectures and circuitry can be used to provide various selection circuitry of different drivers with different clock sources while still taking advantage of the retiming techniques described here where retiming is applied only at the output stage drivers.

Figure 4:
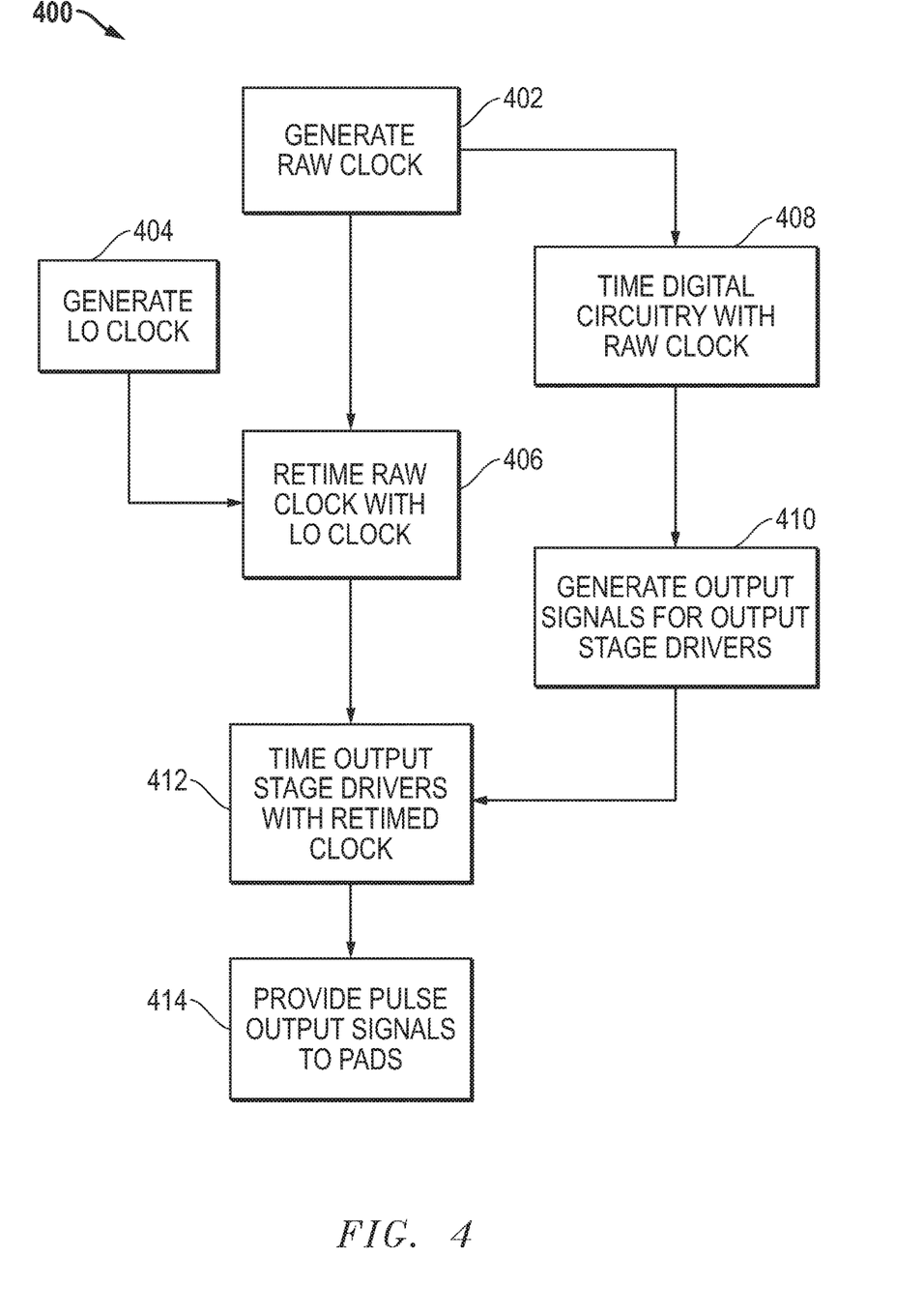
FIG. 4 is a process flow diagram of an example embodiment where a retimed clock is used to time output stage drivers.

FIG. 4 is a process flow diagram of an example embodiment 400 where a retimed clock 128 is used to time output stage drivers 146. In block 402, a raw digital clock 124 is generated, for example, by a clock generator 122. In block 404, an LO clock 118 is generated, for example by LO circuitry 116. In block 406, the raw digital clock 124 is retimed with the LO clock 118, for example, using retime circuit 126 that is configured to retime the raw digital clock 124 with the LO clock 118 to generate the retimed clock 128. In block 408, digital circuitry within the RF communication IC 100 is timed with the raw digital clock. For example, as described above for one embodiment, this digital circuitry can include DSP 106, ADC circuitry 130, controller circuitry 140 including timer logic 142, and output circuitry (e.g., PWM circuitry) 144 (except for the output stage drivers 146), and/or other digital circuitry. In block 410, output signals are generated for output stage drivers 146 based upon the operation of the digital circuitry. In block 412, the output stage drivers 146 are timed with the retimed clock 128 to generate pulse output signals that have edge transitions based upon the retimed clock 128. In block 414, pulse output signals are provided to by the output stage drivers 146 to the output pads 148. It is noted that different and/or additional operational steps could be used while still taking advantage of the retiming techniques described here where retiming is applied only at the output stage driver.

It is noted that the output signals generated and applied to the output stage drivers 146 can be configured based upon the particular application being implemented. For example, these output signals can be PWM digital control signals that are configured to generate pulses having selected densities and/or widths within a selected time period. For one embodiment, these PWM digital control signals can represent desired on/off control for LEDs (light emitting diodes) that determine light intensity output by a programmable lighting device. For one embodiment, the PWM digital control signals can represent desired one/off control for one or more motors. It is further noted that the output signals and/or PWM digital control signals can be used for other purposes while still taking advantage of the techniques described herein.

It is noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software, firmware, and/or other program instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are used to program the one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An integrated circuit, comprising:
   a first clock generator having a digital clock as an output;
   a second clock generator having a local oscillator (LO) clock as an output;
   radio frequency (RF) circuitry coupled to operate using the LO clock;
   a circuit coupled to receive the digital clock and the LO clock as inputs and having a retimed clock as an output, the retimed clock representing the digital clock retimed with the LO clock;
   digital circuitry coupled to have internal timing based upon the digital clock; and
   one or more drivers coupled to be timed by the retimed clock, each driver being coupled to provide a pulse output signal to an output pad.

2. The integrated circuit of claim 1, further comprising output circuitry including the one or more drivers, wherein digital circuitry within the output circuitry other than the one or more drivers is coupled to have internal timing based upon the digital clock.

3. The integrated circuit of claim 2, wherein the output circuitry comprises pulse width modulation (PWM) output circuitry and wherein the one or more drivers comprise PWM drivers.

4. The integrated circuit of claim 1, wherein the digital circuitry comprises analog-to-digital converter (ADC) circuitry coupled to one or more input pads to sample one or more analog input signals and coupled to have internal timing based upon the digital clock.

5. The integrated circuit of claim 4, further comprising controller circuitry having internal timing based upon the digital clock and having one or more sampling trigger signals as outputs that are coupled to the ADC circuitry to determine sample timing with respect to the one or more analog input signals.

6. The integrated circuit of claim 1, further comprising one or more multiplexers coupled between the one or more drivers and the retimed clock.

7. The integrated circuit of claim 6, wherein each multiplexer has the digital clock and the retimed clock as inputs and a timing clock as an output to the one or more drivers.

8. The integrated circuit of claim 1, wherein the one or more drivers is a plurality of drivers, wherein a first set of the drivers are configured to receive the digital clock as a timing clock, wherein a second set of the drivers are configured to receive the retimed clock as a timing clock, and wherein one or more output pads are configured to selectively receive an output from a driver in the first set of drivers or an output from a driver in the second set of drivers.

9. The integrated circuit of claim 8, further comprising one or more multiplexers associated with first set of drivers and the second set of drivers, each multiplexer having an output from a driver in the first set of drivers and an output from a driver in the second set of drivers as inputs and having an output coupled to an output pad.

10. The integrated circuit of claim 1, wherein each of the one or more drivers comprises latch circuitry and an output stage.

11. The integrated circuit of claim 10, wherein the latch circuitry and the output stage are implemented using a data (D) latch and one or more data (D) flip-flops.

12. A method to operate an integrated circuit, comprising:
    generating a digital clock;
    generating a local oscillator (LO) clock;
    operating radio frequency (RF) circuitry using the LO clock;
    retiming the digital clock with the LO clock to generate a retimed clock;
    timing digital circuitry with the digital clock; and
    timing one or more drivers with the retimed clock, each driver providing a pulse output signal to an output pad;
    wherein the generating, operating, retiming, and timing occur within an integrated circuit.

13. The method of claim 12, wherein the one or more drivers are included within output circuitry, and further comprising timing digital circuitry within the output circuitry other than the one or more drivers with the digital clock.

14. The method of claim 13, wherein the output circuitry comprises pulse width modulation (PWM) output circuitry and wherein the one or more drivers comprise PWM drivers.

15. The method of claim 12, wherein the timing digital circuitry comprises timing analog-to-digital convert (ADC) circuitry with the digital clock to sample one or more analog input signals from one or more input pads.

16. The method of claim 15, further comprising timing controller circuitry with the digital clock and outputting one or more sampling trigger signals from the controller circuitry to the ADC circuitry to determine sample timing with respect to the one or more analog input signals.

17. The method of claim 12, further comprising providing the retimed clock to the one or more drivers through one or more multiplexers.

18. The method of claim 17, further comprising receiving the digital clock and the retimed clock with the one or more multiplexers and outputting a timing clock to the one or more drivers.

19. The method of claim 12, wherein the one or more drivers is a plurality of drivers, and further comprising receiving the digital clock as a timing clock for a first set of the drivers, receiving the retimed clock as a timing clock for a second set of the drivers, and selectively providing an output from a driver in the first set of drivers or an output from a driver in the second set of drivers to one or more output pads.

20. The method of claim 19, wherein one or more multiplexers are associated with first set of drivers and the second set of drivers, and further comprising for each multiplexer, receiving an output from a driver in the first set of drivers and an output from a driver in the second set of drivers as inputs and providing an output to an output pad.

21. The method of claim 12, wherein each of the one or more drivers comprises latch circuitry and an output stage.

22. The method of claim 21, wherein the latch circuitry and the output stage are implemented using a data (D) latch and one or more data (D) flip-flops.

* * * * *